(12) United States Patent
Otani et al.

(10) Patent No.: US 9,329,374 B2
(45) Date of Patent: May 3, 2016

(54) PROJECTION LENS AND OPTICAL SURFACE DETERMINATION METHOD

(71) Applicant: KOITO MANUFACTURING CO., LTD., Minato-ku, Tokyo (JP)

(72) Inventors: Tomoaki Otani, Shizuoka (JP); Naoki Uchida, Shizuoka (JP); Noriko Sato, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 131 days.

(21) Appl. No.: 14/167,516

(22) Filed: Jan. 29, 2014

(65) Prior Publication Data

US 2014/0218937 A1 Aug. 7, 2014

(30) Foreign Application Priority Data

Feb. 7, 2013 (JP) .................................. 2013-021966

(51) Int. Cl.
*G02B 17/08* (2006.01)
*F21S 8/10* (2006.01)

(52) U.S. Cl.
CPC ........... *G02B 17/086* (2013.01); *F21S 48/1154* (2013.01); *F21S 48/1329* (2013.01); *F21S 48/1364* (2013.01); *F21S 48/1394* (2013.01)

(58) Field of Classification Search
CPC .. G02B 17/086; G02B 17/0856; G02B 13/06; F21S 48/1154; F21S 48/1364; F21S 48/1329; F21S 47/1394
USPC .......................................... 359/678, 725–732
See application file for complete search history.

(56) References Cited

U.S. PATENT DOCUMENTS

| | | | |
|---|---|---|---|
| 6,867,929 B2 * | 3/2005 | Lopez-Hernandez et al. | 359/726 |
| 8,355,214 B2 * | 1/2013 | Winston et al. | 359/729 |
| 2004/0252390 A1 * | 12/2004 | Benitez et al. | 359/858 |
| 2008/0316761 A1 * | 12/2008 | Minano et al. | 362/518 |
| 2013/0135887 A1 * | 5/2013 | Otani et al. | 362/516 |

FOREIGN PATENT DOCUMENTS

JP 2005-011704 A 1/2005

\* cited by examiner

*Primary Examiner* — Jordan Schwartz
(74) *Attorney, Agent, or Firm* — Sughrue Mion, PLLC (57) ABSTRACT

A projection lens includes a rear face through which light emitted from a light source enters, and a front face from which the light is emitted in front of a vehicle in a predetermined light distribution pattern. The projection lens is configured such that, upon entering the projection lens, an incoming wavefront emitted from the light source is internally reflected by a first reflection region of the front face, a first intermediate wavefront generated by the internal reflection by the first reflection region is internally reflected by a second reflection region of the rear face, a second intermediate wavefront generated by the internal reflection by the second reflection region is refracted by a refraction region of the front face, and the refracted wavefront is emitted as an outgoing wavefront. The second reflection region is an optical surface determined based on the first intermediate wavefront and the second intermediate wavefront.

2 Claims, 8 Drawing Sheets

PROJECTION LENS AND OPTICAL SURFACE DETERMINATION METHOD

INCORPORATION BY REFERENCE

The disclosure of Japanese Patent Application No. 2013-021966 filed on Feb. 7, 2013 including the specification, drawings and abstract is incorporated herein by reference in its entirety.

BACKGROUND OF THE INVENTION

1. Field of the Invention

The present invention relates to a projection lens and an optical surface determination method.

2. Description of Related Art

Conventionally, there has been known a vehicular headlamp configured such that a light-emitting element is placed to face forward in vicinity to a predetermined point on an optical axis extending in a vehicular longitudinal direction so that light from the light-emitting element is directed forward by a light-passing member disposed in front of the light-emitting element (see Japanese Patent Application Publication No. 2005-11704 (JP2005-11704 A)).

The vehicular headlamp is configured such that the light-passing member receives light emitted from the light-emitting element and, after the light is internally reflected by a front face of the light-passing member first and then by a rear face thereof, emits the light from the front face. A central region on the front face of the light-passing member is subjected to mirror finishing so that the light emitted from the light-emitting element is internally reflected. By employing such a configuration, it is possible to realize a thin vehicular headlamp.

In a general refracting optical system or reflecting optical system, if an incoming wavefront and an outgoing wavefront with respect to one refractive surface or reflective surface are defined, it is possible to easily determine a unique refractive surface or reflective surface.

However, in the above light-passing member, light entering from the rear face is internally reflected twice and then emitted from the front face. In view of this, even if an incoming wavefront entering the light-passing member and an outgoing wavefront output from the light-passing member are defined, it is difficult to determine a unique rear face of the light-passing member.

SUMMARY OF THE INVENTION

The present invention provides a projection lens having an optical surface determined in consideration of intermediate wavefronts, and an optical surface determination method.

A first aspect of the present invention relates to a projection lens including a rear face through which light emitted from a light source enters, and a front face from which the light is emitted in front of a vehicle in a predetermined light distribution pattern. The projection lens is configured such that, upon entering the projection lens, an incoming wavefront emitted from the light source is internally reflected by a first reflection region of the front face of the projection lens, a first intermediate wavefront generated by the internal reflection by the first reflection region is internally reflected by a second reflection region of the rear face of the projection lens, a second intermediate wavefront generated by the internal reflection by the second reflection region is refracted by a refraction region of the front face of the projection lens, and the refracted wavefront is emitted as an outgoing wavefront. The second reflection region is an optical surface determined based on the first intermediate wavefront and the second intermediate wavefront.

According to the first aspect, it is possible to realize a projection lens having an optical surface determined based on intermediate wavefronts.

A second aspect of an optical surface determination method for a projection lens that receives light entering through a rear face of the projection lens, internally reflects the light twice, and then emits the light from a front face of the projection lens. The optical surface determination method includes: setting an incoming wavefront of light that emitted from a light source and enters the projection lens; setting an outgoing wavefront of light that is emitted from the projection lens and forms a predetermined light distribution pattern; setting a shape of the front face of the projection lens; setting a shape of an incidence region in the rear face of the projection lens, through which the incoming wavefront emitted from the light source enters the projection lens; calculating a first intermediate wavefront generated by an internal reflection by a first reflection region of the front face of the projection lens, based on a shape of the first reflection region; calculating a second intermediate wavefront before refracted by a refraction region of the front face of the projection lens, based on a shape of the refraction region; and determining, as an optical surface, a shape of a second reflection region in the rear face of the projection lens, which reflects the first intermediate wavefront and outputs the second intermediate wavefront, based on the first intermediate wavefront and the second intermediate wavefront.

According to this aspect, it is possible to easily determine an optical surface of a projection lens forming a predetermined light distribution pattern by use of internal reflections.

According to the present invention, it is possible to provide a projection lens having an optical surface determined in consideration of intermediate wavefronts, and an optical surface determination method.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes the present invention based on an embodiment with reference to the drawings. The same or equivalent constituents, members, or processes in the drawings have the same reference sign, and a redundant description thereof is omitted appropriately. Further, the embodiment does not limit the invention, but is just an example of the invention, and all features and combinations thereof described in the embodiment are not necessarily essential to the invention.

Figure 1A:
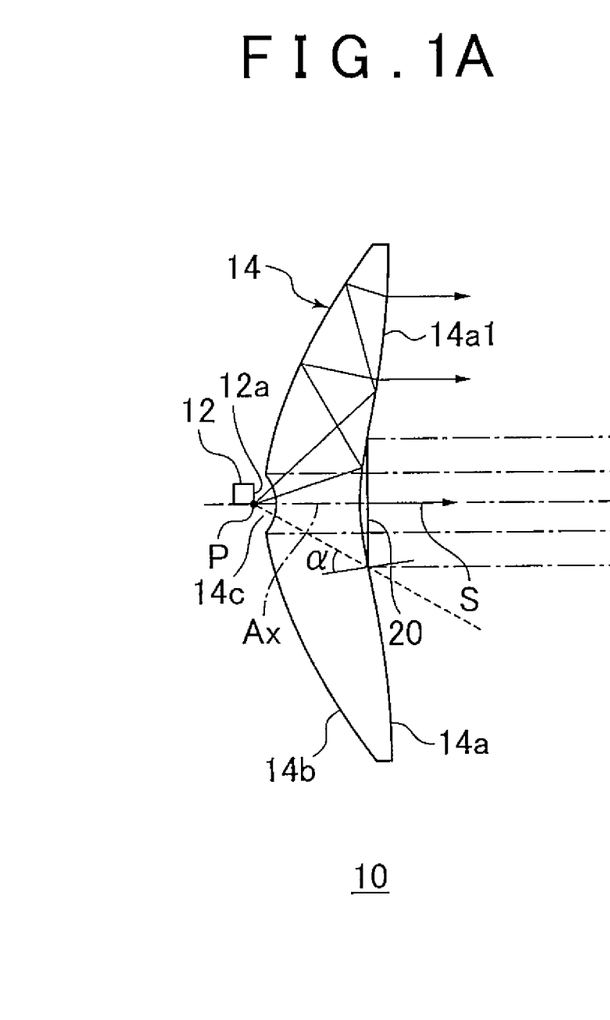
FIG. 1A is a cross-sectional view illustrating a vehicular headlamp according to the present embodiment.
Figure 1B:
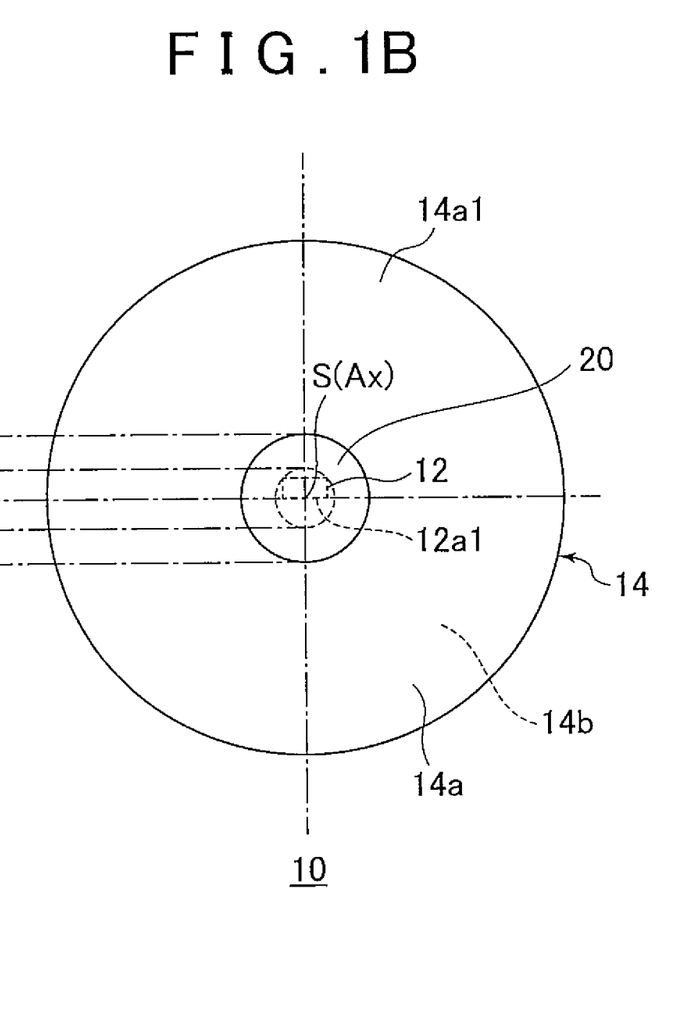
FIG. 1B is a front view illustrating the vehicular headlamp according to the present embodiment.
Figure 2:
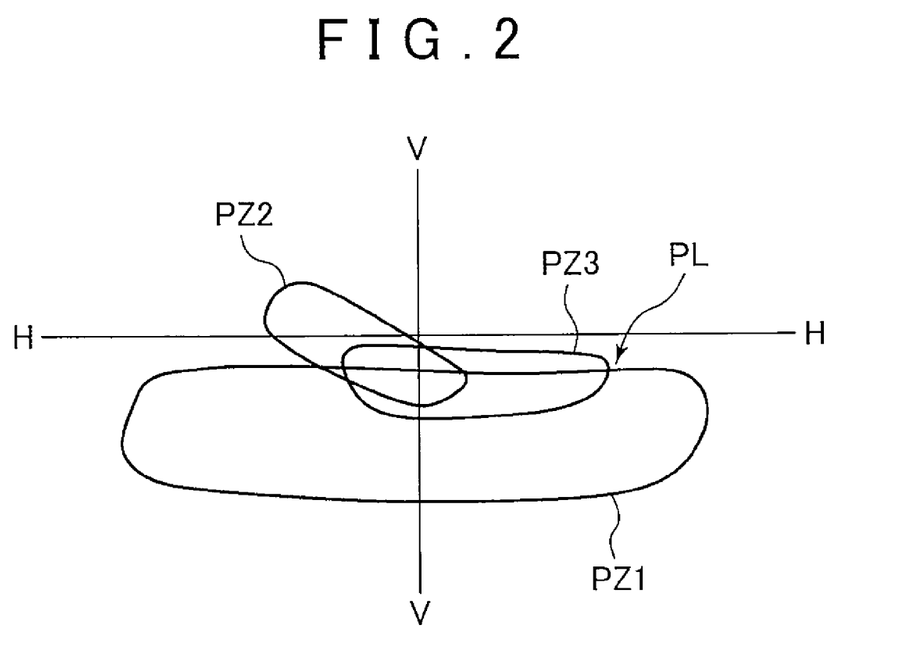
FIG. 2 is a view schematically illustrating a low-beam distribution pattern PL formed from light radiated forward from the vehicular headlamp, on a virtual vertical screen disposed at a predetermined position in front of a lamp.

Initially described is a schematic configuration of a vehicular headlamp according to the present embodiment. FIG. 1A is a cross-sectional view illustrating a vehicular headlamp 10 according to the present embodiment, and FIG. 1B is a front view illustrating the vehicular headlamp 10 according to the present embodiment. A direction shown by an arrow S in FIG. 1A indicates a vehicular front direction (a lamp front direction). One vehicular headlamp is provided on each of a left front portion and a right front portion of a vehicle. The following description deals with a configuration of one vehicular headlamp 10. FIG. 2 is a view schematically illustrating a low-beam distribution pattern PL formed from light radiated forward from the vehicular headlamp, on a virtual vertical screen disposed at a predetermined position in front of a lamp.

Note that the following description assumes that the arrow S shown in FIG. 1A substantially coincides with a virtual optical axis. The optical axis may be regarded as a direction in which an emission amount of a luminous flux is maximum in a luminous intensity distribution of emission light from a light source, for example. Further, in a case where the light source is a light-emitting diode (LED), a perpendicular line of a light-emitting surface may be regarded as the optical axis. Further, in an optical system including a light-passing member such as a lens, a virtual light lay representing a luminous flux passing through the whole system may be regarded as the optical axis. Further, a rotation symmetric axis of the light-passing member may be regarded as the optical axis. For example, in a general concavo-convex lens, a straight line connecting centers of curvature of a front face and a rear face thereof may be defined as the optical axis.

The term "optical axis" used in the present embodiment can take at least any of the above definitions, but is not necessarily limited to those definitions. The term "optical axis" may also take other definitions appropriately without departing from the present invention. The following description is made on the premise that the rotation symmetric axis of the light-passing member is regarded as the optical axis.

As illustrated in these figures, the vehicular headlamp 10 according to the present embodiment includes a light-emitting element 12 as a light source, and a light-passing member 14 disposed in front of the light-emitting element 12. The light-emitting element 12 is disposed facing forward in vicinity to a predetermined point p on an optical axis Ax extending in a vehicular longitudinal direction.

The vehicular headlamp 10 is used in a state where the vehicular headlamp 10 is incorporated in a lamp body or the like (not shown) in an optical axis adjustable manner. In a state where the optical axis adjustment is completed, the optical axis Ax of the vehicular headlamp 10 extends downward by around 0.5 to 0.6 degrees with respect to a vehicular forward direction. A low-beam distribution pattern PL for left side light distribution as illustrated in FIG. 2 is formed from radiated light from the vehicular headlamp 10. Note that the same effect can be obtained by employing the same configuration for a low-beam distribution pattern for right side light distribution.

The light-emitting element 12 is a white light emission diode, and is constituted by a plurality of light-emitting chips disposed in series in a horizontal direction, and a substrate for supporting the plurality of light-emitting chips.

In a state where the plurality of light-emitting chips is disposed so as to be close to each other, their front faces are sealed by a thin film, thereby constituting a light-emitting surface 12a for emitting light in a horizontally oblong shape when the lamp is viewed from its front. In this case, each of the light-emitting chips has a square contour of about 1 mm$^2$ (1 mm×1 mm).

The light-emitting element 12 is disposed such that a lower edge 12a1 of the light-emitting surface 12a is positioned on a horizontal line perpendicular to the optical axis Ax at the predetermined point P. That is, the light-emitting element 12 is disposed so as to have the light-emitting surface 12a of which the lower edge 12a1 linearly extends, and to position the lower edge 12a1 of the light-emitting surface 12a on the horizontal line substantially perpendicular to the optical axis Ax.

The light-passing member 14 is made of a transparent synthetic resin molded product such as an acrylic resin molded product, and has a circular contour when the lamp is viewed from the front. The light-passing member 14 functions as a projection lens for projecting, in front of a vehicle, light emitted from the light-emitting element 12 in a predetermined light distribution pattern. An outside diameter of the light-passing member 14 is set to a value of around 100 mm. The light-passing member 14 is configured to receive a light emitted from the light-emitting element 12. Also, the light-passing member 14 is configured such that, upon entering the light-passing member 14, the light emitted from the light-emitting element 12 is internally reflected by a front face 14a thereof, the reflected light is internally reflected again by a rear face 14b thereof, and then the twice reflected light is emitted forward from the front face 14a. The rear face 14b is subjected to mirror finishing by plating or evaporation of aluminum.

The front face 14a of the light-passing member 14 is constituted by a free-form surface for totally reflecting, by its inner surface, at least part of light entering the light-passing member 14 from the light-emitting element 12. Further, the rear face 14b of the light-passing member 14 is constituted by a predetermined optical reflection controlling surface formed based on a free-form surface as a reference plane.

Further, a circular front-face reflecting portion 20 is formed on a central region (a region within a predetermined range around the optical axis Ax) of the front face 14a of the light-passing member 14. The circular front-face reflecting portion 20 reflects light from the light-emitting element 12, toward the rear face 14b. A central part of the front-face reflecting portion 20 is recessed toward the light-emitting element 12 and subjected to mirror finishing by aluminum evaporation. Here, the "central part" indicates a certain region in the front face 14a of the light-passing member 14 which intersects with the optical axis Ax. Note that an optical axis of the light-emitting element 12 may be disposed so as to be inclined with respect to the optical axis Ax (a rotation symmetric axis) of the light-passing member 14. In this case, a certain region of the front face 14a of the light-passing member 14 which does not intersect with the rotation symmetric axis of the light-passing member 14, but intersects with the optical axis of the light-emitting element 12 may be referred to as the "central part."

A position of an outer peripheral edge of the circular front-face reflecting portion 20 is set to a position where an incidence angle of the light from the light-emitting element 12 (precisely, light from the predetermined point P) which reaches the front face 14a of the light-passing member 14 becomes a critical angle α, as illustrated in FIG. 1A. On that account, the light-passing member 14 is configured such that the light from the light-emitting element 12 which reaches the front face 14a of the light-passing member 14 is internally reflected by the front-face reflecting portion 20 subjected to mirror finishing, while being totally reflected by a peripheral region 14a1 outside the front-face reflecting portion 20.

Thus, the light-passing member 14 according to the present embodiment is configured such that its central part is recessed toward the light-emitting element 12. In view of this, in comparison with a case where the front face of the light-passing member is plane, it is possible to widen a region where the light from the light source which enters the light-passing member 14 is totally reflected by the inner surface of the light-passing member 14. In other words, it is possible to reduce an area of the front-face reflecting portion 20 subjected to a process, such as mirror finishing, which is necessary to reflect the light from the light-emitting element 12 which is not totally reflected by the front face 14a of the light-passing member 14.

Further, in a case where the front face of the light-passing member is plane, light emitted from the light-emitting element to a direction along the optical axis Ax just returns toward the light-emitting element. On that account, some of the light cannot be taken outside efficiently depending on emission directions from the light-emitting element, and such light partially causes glare. According to the light-passing member 14 of the present embodiment, the front-face reflecting portion 20 provided on the front face of the light-emitting element 12 is a curved surface, so that light emitted from the light-emitting element 12 to the direction along the optical axis Ax hardly returns toward the light-emitting element 12 even if the light is reflected by the front-face reflecting portion 20.

This accordingly restrains a light ray from being reflected several times by the front-face reflecting portion 20, and also restrains occurrence of light enclosed inside the light-passing member 14 and light to cause glare without contributing to formation of a light distribution pattern. This eventually further increases a luminous flux emitted from the light-passing member 14 and contributing to the formation of the light distribution pattern.

Shapes of the front face 14a and the rear face 14b of the light-passing member 14 are constituted by a non-rotation symmetrical surface such as a free-form surface. The shape of the free-form surface is configured such that, if light reflected by the front-face reflecting portion 20 and light totally reflected by the peripheral regions 14a are reflected again by the rear face 14b and radiated forward, those lights are emitted from the light-passing member 14 as parallel beams.

The rear face 14b of the light-passing member 14 is formed so as to circularly surround the optical axis Ax, and a space 14c surrounding the light-emitting element 12 is formed in a center of the rear face 14b. A front end face of the space 14c is formed in a hemispherical shape around the predetermined point P, and hereby, emission light from the light-emitting element 12 (precisely, emission light from the predetermined point P) enters the light-passing member 14 without refraction. The space 14c may be filled with a material having an index of refraction closer to that of a material constituting the light-passing member 14.

Figure 3:
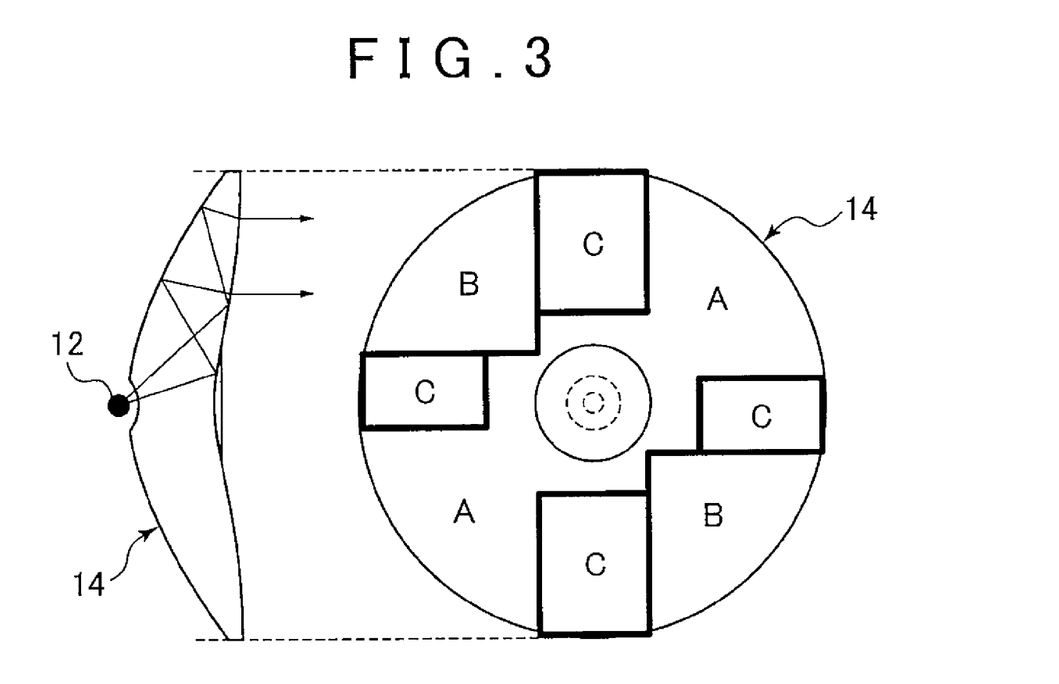
FIG. 3 is a view schematically illustrating a relationship between types of wavefronts output by a light-passing member and an optical reflection controlling surface.
Figure 4A:
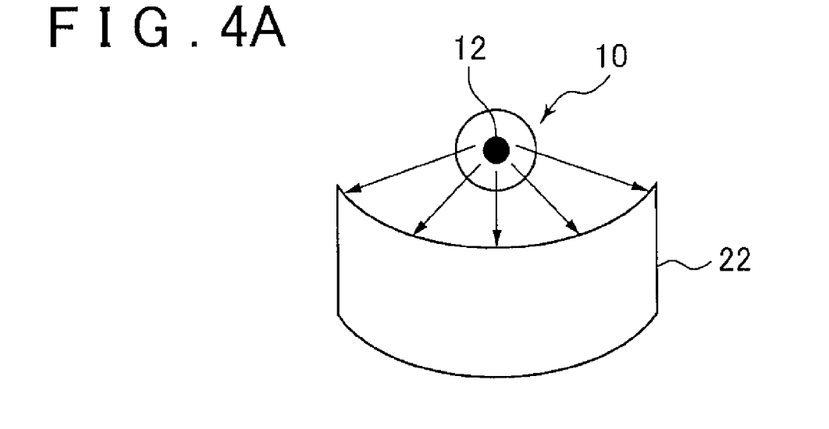
FIG. 4A is a view schematically illustrating a diffusing wavefront output from a region A illustrated in FIG. 3.
Figure 4B:
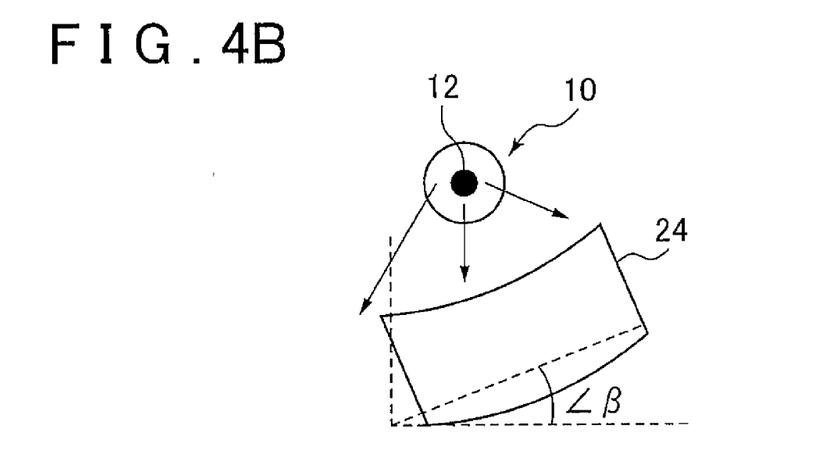
FIG. 4B is a view schematically illustrating an inclined wavefront output from a region B illustrated in FIG. 3.
Figure 4C:
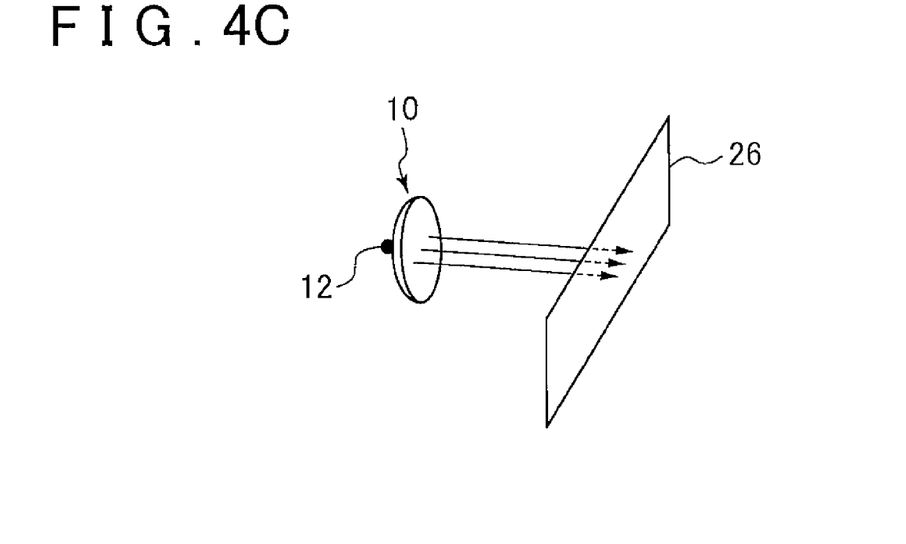
FIG. 4C is a view schematically illustrating a condensing wavefront output from a region C illustrated in FIG. 3.

Next will be described a concrete configuration of the rear face 14b of the light-passing member 14 as the optical reflection controlling surface. FIG. 3 is a view schematically illustrating a relationship between types of wavefronts output by the light-passing member 14 and the optical reflection controlling surface. FIG. 4A is a view schematically illustrating a diffusing wavefront output from a region A illustrated in FIG. 3, FIG. 4B is a view schematically illustrating an inclined wavefront output from a region B illustrated in FIG. 3, and FIG. 4C is a view schematically illustrating a condensing wavefront output from a region C illustrated in FIG. 3.

Light having a diffusing wavefront 22 illustrated in FIG. 4A forms a light distribution pattern PZ1 illustrated in FIG. 2. Light having an inclined wavefront 24 illustrated in FIG. 4B forms a light distribution pattern PZ2 illustrated in FIG. 2. Light having a condensed wavefront 26 illustrated in FIG. 4C forms a light distribution pattern PZ3 illustrated in FIG. 2. A low-beam distribution pattern PL is formed by combining the light distribution patterns PZ1, PZ2, and PZ3.

Next will be described a wavefront change in the light-passing member 14. FIGS. 5A to 5F are views to described how a circular (spherical) wave emitted from the light-emitting element 12 is internally reflected twice inside the light-passing member 14, and then output forward as a plane wave.

Here, the wavefront may be regarded as, for example, a simultaneous expanse (an equiphase surface) of light rays emitted in various directions from a light source at a given time. That is, reflection and refraction of a plurality of light rays in the light-passing member 14 may be expressed as propagation of one wavefront.

Figure 5A:
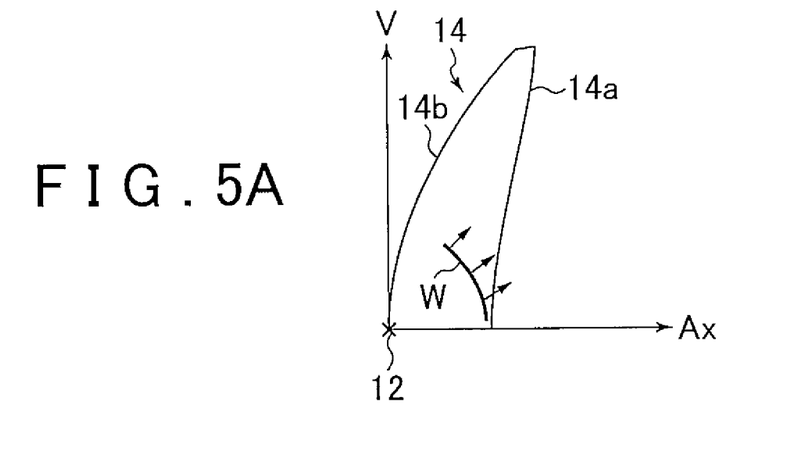
FIGS. 5A to 5F are views to described how a circular (spherical) wave emitted from a light-emitting element is internally reflected twice inside the light-passing member, and then output forward as a plane wave.
Figure 5B:
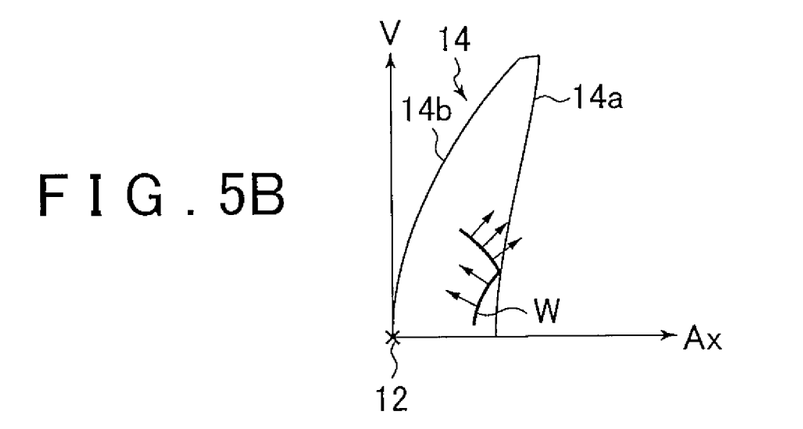
Figure 5C:
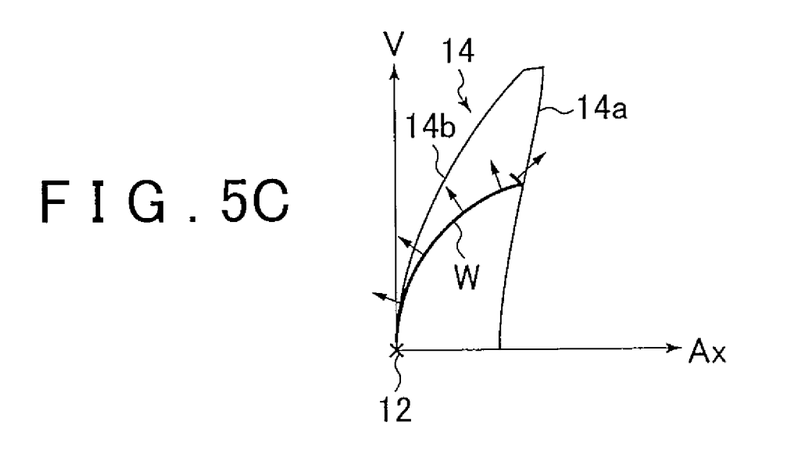
Figure 5D:
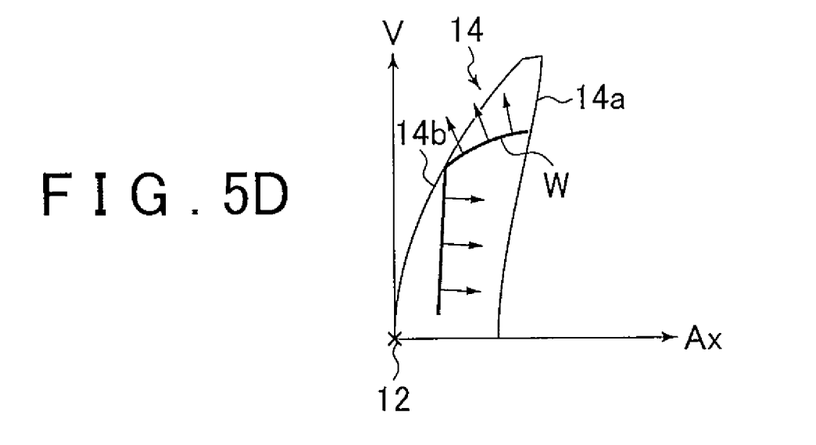
Figure 5E:
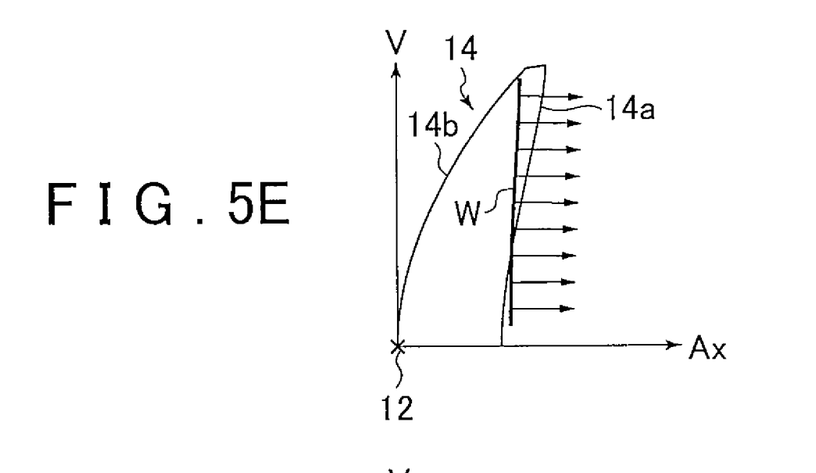
Figure 5F:
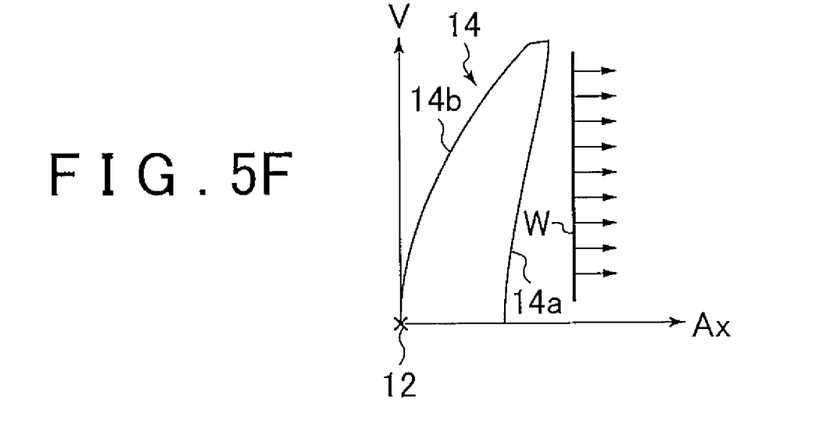

More specifically, as illustrated in FIG. 5A, light emitted in any direction from the light-emitting element 12 as the light source enters the light-passing member 14 as an incoming wavefront, and propagates as one wavefront W inside the light-passing member 14. Then, as illustrated in FIG. 5B, the wavefront W is internally reflected by a first reflection region of the front face 14a of the light-passing member 14, and directed toward the rear face 14b (see FIG. 5C). After that, the wavefront W is internally reflected again by a second reflection region of the rear face 14b, and directed toward the front face 14a of the light-passing member 14 (see FIG. 5D, FIG. 5E). Then, the wavefront W is refracted by a refraction region of the front face 14a, and output as a plane wave (FIG. 5F). Note that the first reflection region and the refraction region in the front face 14a of the light-passing member 14 may be completely or partially overlapped with each other, or may not be overlapped with each other at all.

The present invention simplifies the design of an optical surface of the light-passing member 14 by focusing on one wavefront defined by a plurality of light rays to be emitted from the light source. A basic thought thereof is such that an optical surface such as a reflective surface or a refractive surface is determined uniquely if a wavefront before entering the optical surface and a wavefront after emitted from the optical surface have been already known.

Figure 6A:
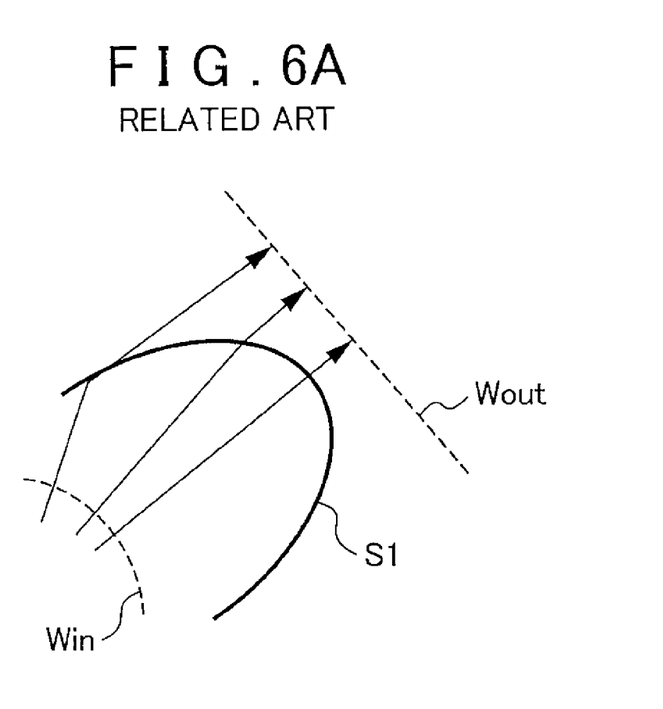
FIG. 6A is a view illustrating a relationship between an incoming wavefront and an outgoing wavefront in a conventional refracting optical system.
Figure 6B:
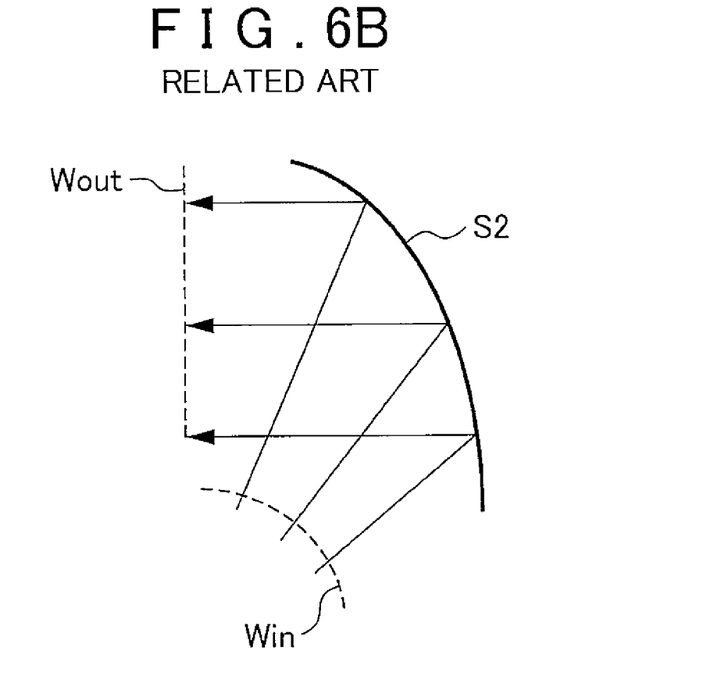
FIG. 6B is a view illustrating a relationship between an incoming wavefront and an outgoing wavefront in a conventional reflecting optical system.

FIG. 6 is a view illustrating a relationship between an incoming wavefront and an outgoing wavefront in a conventional refracting optical system, and FIG. 6B is a view illustrating a relationship between an incoming wavefront and an outgoing wavefront in a conventional reflecting optical system. As illustrated in FIGS. 6A, 6B, if an incoming wavefront Win and an outgoing wavefront Wout have been known, a refractive surface S1 or a reflecting surface S2 therebetween can be determined uniquely.

However, like the light-passing member 14 according to the present embodiment, in a case where an incoming wavefront is directed forward as an outgoing wavefront after two internal reflections and one refraction, even if the incoming wavefront and the outgoing wavefront have been known, the front face 14a and the rear face 14b cannot be determined uniquely. On that account, in order to determine a light-passing member that is able to obtain a predetermined light distribution pattern, it is necessary to set shapes of its front face and its rear face through trial and error, and there is room for improvement for a designing method.

FIGS. 7A to 7D are views to describe an optical surface determination method of the light-passing member 14 according to the present embodiment. This method is used, for example, for an optical surface determination method for a projection lens that outputs, from its front face, light entering from its rear surface after internally reflecting the light twice.

Figure 7A:
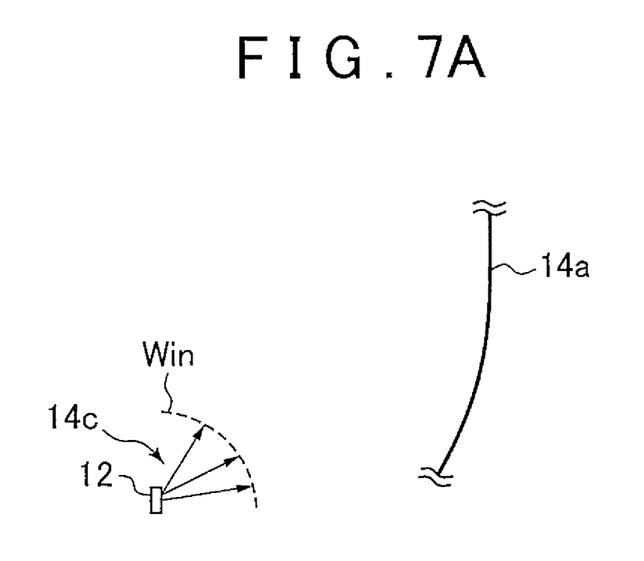
FIGS. 7A to 7D are views to describe an optical surface determination method of a light-passing member according to the present embodiment.
Figure 7B:
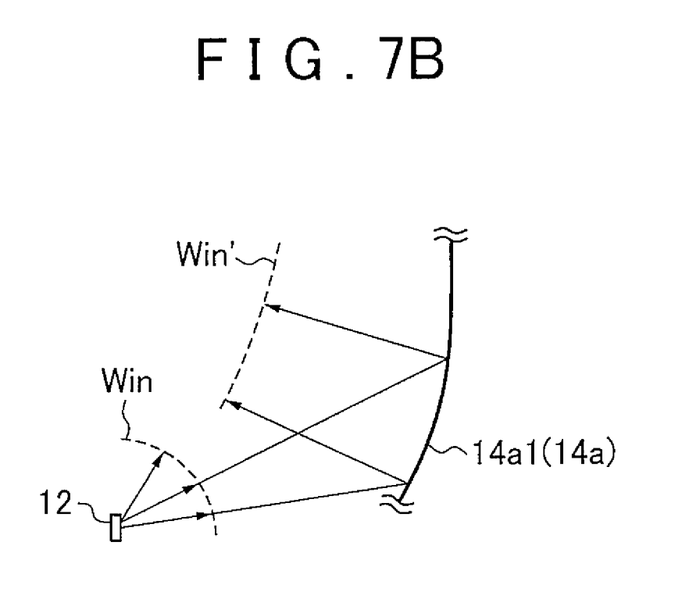

Initially, as illustrated in FIG. 7A, an incoming wavefront Win of light which is emitted from the light-emitting element 12 and enters the light-passing member 14 is set. Further, a shape of an incidence region in the rear face 14b of the light-passing member 14, through which the incoming wavefront Win enters the projection lens, is set. Further, a shape of the front face 14a of the light-passing member 14 is set. In a case where a shape of the space 14c, as an incidence region, is hemispherical, the light emitted from the light-emitting element 12 just passes through an incidence surface (part of the rear face 14b). Therefore, the incoming wavefront Win is defined as a spherical wave. As illustrated in FIG. 7B, a first intermediate wavefront Win' obtained by internal reflection by the first reflection region (the peripheral region 14a1) of the front face 14a of the light-passing member 14 is calculated based on the shape of the first reflection region.

Figure 7C:
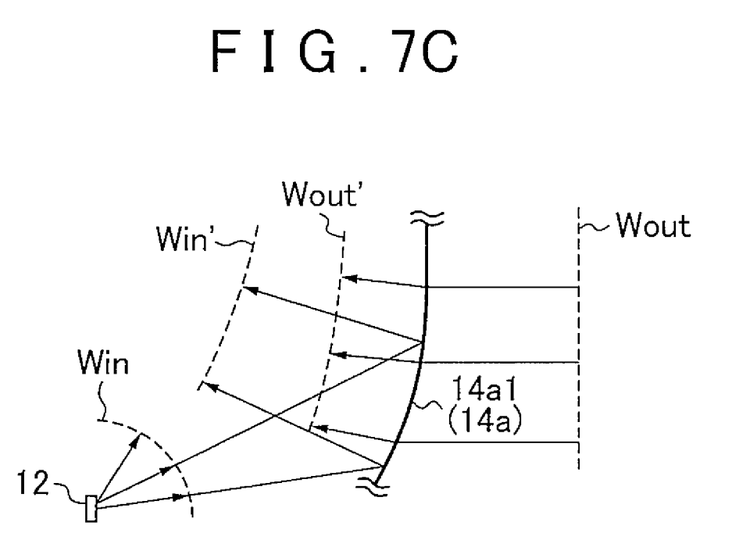

In the meantime, as illustrated in FIG. 7C, an outgoing wavefront Wout of light, which is emitted from the light-passing member 14 and forms a predetermined light distribution pattern, is set. The outgoing wavefront Wout can be defined, for example, as a plane wave forming the predetermined light distribution pattern. Further, a second intermediate wavefront Wout' before refracted by the refraction region (the peripheral region 14a1) of the front face 14a of the light-passing member 14 is calculated based on the shape of the refraction region.

Then, a shape of the second reflection region 14b1 in the rear face 14b which reflects the first intermediate wavefront Win' and, as a result, outputs the second intermediate wavefront Wout' is determined as an optical surface based on the first intermediate wavefront Win' and the second intermediate wavefront Wout'. Hereby, it is possible to easily determine the optical surface of the light-passing member 14 forming the predetermined light distribution pattern by use of internal reflections.

As described above, the light-passing member 14 functioning as a projection lens is configured such that, upon entering the projection lens, the incoming wavefront Win emitted from the light-emitting element 12 is internally reflected by the first reflection region 14a1 of the front face 14a first and then by the second reflection region 14b1 of the rear face 14b, refracted by the refraction region 14a1 of the front face 14a, and finally emitted as the outgoing wavefront Wout. The second reflection region 14b1 of the rear face 14b is an optical surface determined based on the first intermediate wavefront Win' obtained by internal reflection by the first reflection region 14a1 of the front face 14a and the second intermediate wavefront Wout' to be refracted (i.e., the second intermediate wavefront Wout' before refracted) by the refraction region 14a1 of the front face 14a. Thus, the light-passing member 14 has the optical surface determined based on two intermediate wavefronts Win', Wout'.

Figure 7D:
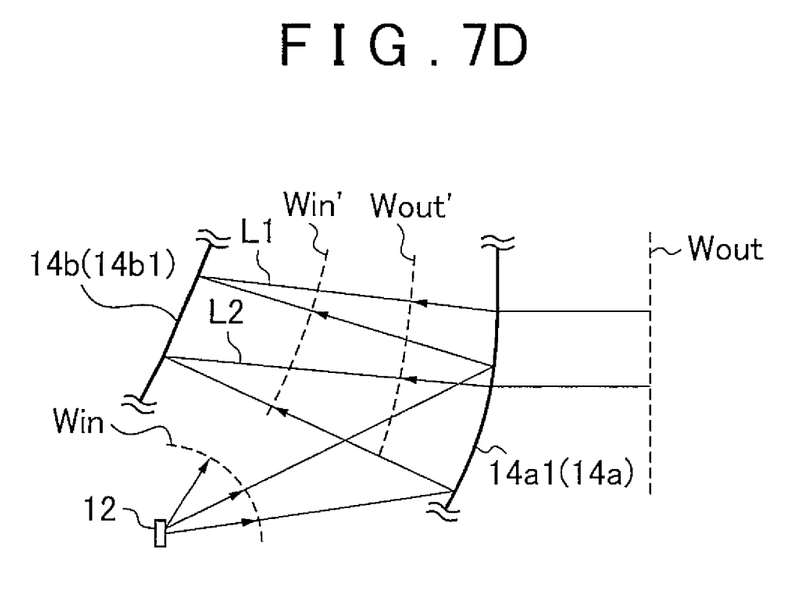

Note that, as illustrated in FIG. 7D, the second reflection region 14b1 of the rear face 14b is configured such that a plurality of light rays L1, L2, which is defined by the second intermediate wavefront Wout' obtained by reflecting the first intermediate wavefront Win', does not intersect with each other inside the light-passing member 14. Hereby, an optical design of the light-passing member 14 forming a predetermined light distribution pattern becomes easy.

The present invention has been described with reference to the above embodiment. However, the present invention is not limited to the above embodiment, and embodiments in which the configurations of the above embodiment are combined or substituted appropriately are also included in the present invention. Further, it is also possible to add, to the above embodiment, modifications such as appropriate rearranging of a combination or an order of processes in the above embodiment or various changes in designing, based on the knowledge of a person skilled in the art. Embodiments to which such modifications are added can be also included within a scope of the present invention. Further, aspects of the present invention include a method, a device, or a system according to the above embodiment.

The shape of the rear face 14b of the light-passing member 14 may be shaped as a step reflector, divided into a plurality of reflective elements. Further, the front face 14a of the light-passing member 14 may be a non-rotation symmetrical surface. Further, the front face 14a of the light-passing member 14 may has a slant shape. Further, the light source may be disposed in a manner such that the light source is rotated around the optical axis. That is, the light source may be disposed such that a bottom end and an upper end of the light-emitting surface of the light source are inclined with respect to a horizontal direction.

Further, in the above embodiment, an aplanatic configuration is realized by use of two reflections by using inner surfaces of the light-passing member as the reflective surfaces. However, the light-passing member is not limited to this, and may be a light-passing member configured to realize an aplanatic configuration by using a front face and a rear face as refractive surfaces. Further, the light-passing member may be a light-passing member configured to realize an aplanatic configuration by combining a refractive surface and a reflective surface.

As the light source, an LED that is small in size and consumes less power (a calorific value is small) is a preferable example, but a type of the light source is not limited as long as at least one side of a light-emitting surface of the light source is formed in a linear shape. However, by using, as the light source, the LED that is small in size and has a small calorific value, a range for choice of a material of the light-passing member (e.g., a resin lens) expands and the light source and the light-passing member can be disposed further closer to each other. This eventually makes it possible to attain downsizing of the lamp and expands the possibility of design.

Note that, differently from a quadratic curve (a quadric surface) or a cubic curve (a cubic surface), for example, a general "free-form surface" may be regarded as a curved surface that cannot be represented by a determined formula. The free-form surfaces constituting at least part of the front face 14a and the rear face 14b of the light-passing member 14 are not limited particularly, as long as the free-form surfaces have a configuration that satisfies the above effect.

What is claimed is:

1. An optical surface determination method for a projection lens that receives light entering through a rear face of the projection lens, internally reflects the light twice, and then emits the light from a front face of the projection lens, the optical surface determination method comprising:
   setting an incoming wavefront of light that is emitted from a light source and enters the projection lens;
   setting an outgoing wavefront of light that is emitted from the projection lens and forms a predetermined light distribution pattern;
   setting a shape of the front face of the projection lens;
   setting a shape of an incidence region in the rear face of the projection lens, through which the incoming wavefront emitted from the light source enters the projection lens;
   calculating a first intermediate wavefront generated by an internal reflection by a first reflection region of the front face of the projection lens, based on a shape of the first reflection region;
   calculating a second intermediate wavefront before refracted by a refraction region of the front face of the projection lens, based on a shape of the refraction region; and
   determining, as an optical surface, a shape of a second reflection region in the rear face of the projection lens, which reflects the first intermediate wavefront and outputs the second intermediate wavefront, based on the calculated first intermediate wavefront and the calculated second intermediate wavefront.

2. The projection lens according to claim 1, wherein the second reflection region is determined such that a plurality of light rays defined by the second intermediate wavefront does not intersect with each other inside the projection lens.

* * * * *